United States Patent Office 3,759,890
Patented Sept. 18, 1973

3,759,890
IMIDAZOLYL DERIVATIVES OF PROTEINS AND POLYSACCHARIDES
Donald Victor Wilson, Needingworth, England, assignor to Hoffmann-La Roche Inc., Nutley, N.J.
No Drawing. Filed Aug. 31, 1971, Ser. No. 176,755
Claims priority, application Great Britain, Sept. 17, 1970, 44,510/70
Int. Cl. C07g 7/00; C08h 1/00
U.S. Cl. 260—112 R    20 Claims

ABSTRACT OF THE DISCLOSURE

Imidazolyl derivatives of polypeptides, proteins, amino-containing polysaccharides and polymers containing at least one primary aliphatic amino group are described. These derivatives are converted into corresponding diazonium compounds which are employed in coupling reactions to produce products useful in immunochemistry.

DESCRIPTION OF THE INVENTION

The present invention relates to imidazolyl derivative compounds which may be represented by the following general formula

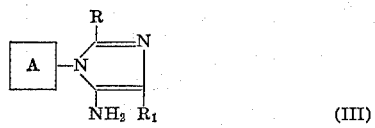

wherein A is a polypeptide, protein, polysaccharide or ploymer radical; R is hydrogen or alkyl; and $R^1$ is hydrogen, aminocarbonyl, mono-alkylaminocarbonyl, dialkylaminocarbonyl, alkoxycarbonyl, aralkoxycarbonyl or cyano.

The above compounds of Formula III may be readily prepared by reacting a primary amine-containing compound of the formula

wherein A is as above,
with an imino compound of the general formula

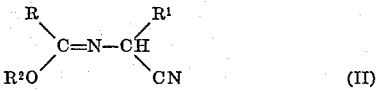

wherein
R and $R^1$ are above; and
$R^2$ is alkyl.

The above reaction between compounds of Formulae I and II may be conducted in an aqueous medium at a pH in the range of between about 7 and 10. Temperature is not narrowly critical to this reaction and a temperature of about room temperature is preferred. It is desirable to utilize an amount of imino compound of Formula II sufficient to block all primary amino groups in the substance represented by Formula I so as to prevent or minimize self-coupling when the product of the reaction is diazotized and coupled in further embodiments of the invention.

As used herein the term "alkyl" represents a straight or branched chain hydrocarbon radical containing no unsaturation. In preferred embodiments of the invention, the alkyl group is a lower alkyl group having from 1 to 4 carbon atoms such as, for example, methyl, ethyl, propyl, isopropyl, butyl and tertiary butyl. Similarly the alkoxycarbonyl groups are preferably lower alkoxycarbonyl groups having up to 4 carbon atoms such as, for example, methoxycarbonyl or ethoxycarbonyl.

The term "aralkoxycarbonyl" includes the mono- or bi-cyclic aryl lower alkoxycarbonyl groups (lower herein also referring to a 1 to 4 carbon atom containing group) such as, for example, the benzyloxycarbonyl group.

In preferred embodiments, R is a alkyl goup, most preferably a lower alkyl group, e.g., methyl, while $R^1$ most preferably is aminocarbonyl. $R^2$, in a preferred embodiment, is ethyl.

A wide variety of substances represented by Formula I can be utilized in the preparation of the compounds of Formula III. For example, the proteins which can be utilized in the practice of the present invention include mammalian serum proteins, such as antibody fractions, e.g., rabbit antibody to human group-O red blood cells or serum albumins such as bovine, rabbit or human serum alumin. Other suitable proteins include ovalbumin, dericinated extract of castor beans and protein components of pollen extracts, e.g., from timothy grass. Examples of suitable polypeptides include L or DL-polylysine or hormones such as insulin. It should be noted that the polysaccharides useful in the practice of the present invention must be an amino-containing polysaccharide as per the representation of Formula I. Suitable polysaccharides include, for example, aminoethylcellulose.

The polymers useful in the practice of the present invention must contain at least one primary aliphatic group in accordance with Formula I.

The compounds of Formula III, in a further aspect of the present invention, are diazotized in a manner known per se so as to produce the corresponding diazonium compound of the general formula

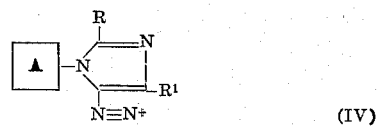

wherein A, R and $R^1$ are as above.

The isolated diazonium reaction as indicated above may be carried out in conditions normally employed for diazonium reactions; for example, by mixing the imidazolyl of Formula III with an aqueous solution of sodium nitrite and treating the mixture at 0°–4° C. with a mineral acid, preferably with hydrochloric acid. It will be appreciated that the indicated diazotization can be carried out using a compound of the Formula III which is water-insoluble.

Thus, the diazonium compounds of Formula IV can be covalently coupled in a further embodiment of the present invention to proteins such as, for example, mammalian serum proteins, e.g., bovine serum albumin, rabbit anti human O antibody and the like (via the lysine, tyrosine, histidine or arginine residues therein), to β-lactoglobulin, to complex organic compounds containing amines or heterocyclic base groups, or to cell membranes, such as mammalian red blood cell membranes including, for example, chicken red blood cells, sheep red blood cells, human red blood cells and the like. Most preferably the diazonium compounds of Formula IV are covalently coupled with proteins or cell membranes.

The coupling reaction may be carried out when one of the coupling components is water-insoluble. In general, it is convenient to carry out the coupling in situ; that is to say, without isolation of the diazonium salt from the medium from which it is prepared. The coupling reaction is, in general, carried out at the same temperature at which the above diazotization is carried out (e.g., 0°–4° C.). When a diazonium salt is coupled with a protein, it is advantageous to carry out the coupling reaction in an aqueous buffer.

The coupling reaction of the present invention produces products useful in the immunochemistry as well as for the preparation of insoluble enzymes. This procedure can be utilized for linking proteins and other substances directly to living cells. Thus, specific uses of the products of the present reaction include the detection and estimation of antibodies or the detection of receptors on cell membranes.

The present invention is further illustrated by reference to the following examples.

EXAMPLE 1

(A) Preparation of (2-methyl-4-carbamoyl-5-amino-1-imidazolyl)-rabbit anti human O antibody Rabbit antibody to human group-O red blood cells was partially purified by precipitation from serum and chromatography on DEAE-cellulose. A mixture of a solution of the resulting antibody (1 ml. containing 30 mg. of protein), 0.5-M sodium bicarbonate solution (4 ml.) and ethyl N-(carbamoyl-cyano-methyl)-acetimidate (100 mg.) was stirred at room temperature for 8 hours, then dialysed overnight against phosphate-buffered saline, the phosphate-buffered saline solution being changed once during the dialysis. The solution remaining in the dialysis bag (5.5 ml.) contained (2-methyl-4-carbamoyl-5-amino-1-imidazolyl)-rabbit anti human O antibody.

(B) Diazotization and coupling of (2-methyl-4-carbamoyl-5-amino-1-imidazolyl)-rabbit anti human O antibody All solutions, reagents and containing vessels were cooled to 4° C. and all manipulations were carried out at this temperature; the solutions were thoroughly mixed after each addition of reagent.

(i) The diazotization.—0.05 ml. of the (2-methyl-4-carbamoyl-5-amino-1-imidazolyl)-rabbit anti human O antibody obtained as described in part A hereinbefore and 0.08 ml. of 0.4% sodium nitrite solution were mixed. 1-N hydrochloric acid (0.08 ml.) was then added, followed 30 seconds later by 2% ammonium sulfamate solution (0.08 ml.). After a further 20 seconds, the resulting diazonium solution was used in the coupling reactions described hereinafter.

(iia) Coupling to the bovine serum albumin.—The freshly prepared diazonium solution was added from a Pasteur pipette to a vigorously stirred solution of bovine serum albumin (20 mg.) in sodium acetate buffer (pH 4.6) previously treated with 1-N sodium hydroxide solution (0.08 ml.). After standing for 1 hour at 4° C., the extent of coupling was assessed by means of the red-cell-linked-antigen reaction. It was found that human group-O red blood cells sensitized with the preparation were agglutinated by anti-rabbit globulin serum (showing that the rabbit anti human O antibody/bovine serum albumin couple was adhering to the cells) and by an anti bovine serum albumin serum (indicating that the bovine serum albumin was linked to the rabbit anti human O antibody), but not by normal rabbit serum.

(iib) Coupling to the β-lactoglobulin.—The freshly prepared diazonium solution was added from a Pasteur pipette to a stirred solution of β-lactoglobulin in acetate buffer pH 4.8 (30 mg. in 3 ml.) contained in a cooled vessel having a glass electrode to measure the pH of the solution. The pH fell during the addition. 1-M sodium hydroxide solution was added to bring the pH to its original value and after a further 10 minutes the pH was adjusted to 7 to 7.5 with further sodium hydroxide. The solution was held overnight at 4° C., centrifuged to remove an insoluble residue and the supernatant was stored at −20° C. Repeated freezing and thawing was avoided.

Human group-O red blood cells sensitized with a dilution of the supernatant in phosphate buffered saline were agglutinated by a rabbit anti-β-lactoglobulin serum. The cells did not agglutinate in the presence of phosphate buffered saline alone or in the presence of normal rabbit serum.

EXAMPLE 2

(A) Preparation of (2-methyl-4-carbamoyl-5-amino-1-imidazolyl)-ovalbumin 100 mg. of ovalbumin, 6 ml. of 0.5-M sodium bicarbonate solution and 10 mg. of ethyl N-(carbamoyl-cyano-methyl)-acetimidate were stirred together at room temperature for 24 hours and then dialyzed against several changes of phosphate-buffered saline to remove unchanged reagents and byproducts. The solution remaining contained (2-methyl - 4 - carbamoyl-5-amino-1-imidazolyl)-ovalbumin.

(B) Diazotization and coupling of (2-methyl-4-carbamoyl - 5 - amino-1-imidazolyl)-ovalbumin rabbit anti-human O antibody All manipulations prior to the addition of the phosphate buffer 9.2 in the coupling reaction described hereinafter were carried out at 4° C. using solutions, reagents and containing vessels cooled to this temperature.

(i) The diazotization.—10 µl. of 1-N hydrochloric acid were added to a mixture of 50 µl. of (2-methyl-4-carbamoyl-5-amino-1-imidazolyl) - ovalbumin in phosphate-buffered saline (centrifuged immediately before use to remove insoluble material) and 10 µl. of aqueous 0.1% sodium nitrite solution. After allowing 30 seconds for diazotization to take place, 10 µl. of 2% ammonium sulfamate solution were added. The solution was mixed and, after a further 20 seconds, the resulting diazonium solution was used in the coupling reaction described hereinafter.

(ii) Coupling to chicken red blood cells.—The freshly prepared diazonium solution was treated with 1 ml. of a 2% suspension of chicken red blood cells in phosphate buffer pH 5.1. The chicken red blood cells were washed three times with phosphate-buffered saline prior to use. The mixture was immediately transferred to a centrifuge tube at 4° C. and three minutes later 10 ml. of phosphate buffer pH 9.2 were added at room temperature. From this point all operations were carried out at room temperature. 10 minutes after adding the pH 9.2 buffer, the cells were centrifuged down in a bench centrifuge at 2,000 revolutions per minute, two-thirds of the supernatant was remove and replaced by phosphate-buffered saline. The cells were re-suspended and again centrifuged at 2,000 revolutions per minute. All of the supernatant was removed and the packed cells were washed twice with 10 ml. of phosphate-buffered saline each time. Finally, the cells were suspended in sufficient phosphate-buffered saline to bring them to their original concentration. The coated cells were agglutinated by rabbit anti-ovalbumin serum.

The buffers referred to hereinbefore have the following composition:

phosphate buffer pH 9.2: 17.75 g. of disodium hydrogen orthophosphate dissolved in sufficient water to make 1 liter of solution.
phosphate buffer pH 5.1: 27.6 g. of sodium dihydrogen orthophosphate dihydrate dissolved in sufficient water to make 1 liter of solution and then adjusted to pH 5.1 by adding phosphate buffer pH 9.2.
phosphate-buffered saline: 1 liter of solution contains 8.0 g. of sodium chloride, 0.2 g. of potassium chloride, 1.15 g. of anhydrous disodium hydrogen orthophosphate, 0.2 g. of potassium dihydrogen orthophosphate and distilled water ad 1 liter.

EXAMPLE 3

By following the procedure described in Example 2A there was prepared (2-methyl-4-carbamoyl-5-amino-1-imidazolyl)-bovine serum albumin which was diazotized according to the procedure described in Example (2Bi) and coupled with sheet red blood cells in the manner described in Example (2Bii). The resulting antigen-coated cells were agglutinated by anti-bovine serum albumin serum alone. When the coated cells were used in a modified Jerne Plaque Assay of a cell population derived from mouse lymph nodes, antibody-producing cells (PFC's) could be detected and counted.

EXAMPLE 4

According to the procedure described in Example 2A there was prepared (2-methyl-4-carbamoyl-5-amino-1-imidazolyl)-bovine serum albumin which was diazotized as described in Example (2Bi) and coupled with human group-O red blood cells according to the procedure described in Example (2Bii). The coated cells were agglutinated by anti-bovine serum albumin serum.

EXAMPLE 5

By following the procedure described in Example 2A there was prepared the (2-methyl-4-carbamoyl-5-amino-1-imidazolyl) derivative of an aqueous extract of pollen from timothy grass. This was diazotized according to the procedure described in Example (2Bi) and then coupled with human group-O red blood cells in the manner described in Example (2Bii). The coated cells were agglutinated by rabbit anti-pollen serum. They formed rosettes with a high proportion of blood basophils taken from a person suffering from hay fever. Basophils from a person not suffering from hay fever were tested as a control, but failed to react.

EXAMPLE 6

The (2 - methyl - 4 - carbamoyl-5-amino-1-imidazolyl) derivative of a de-ricinated extract of castor beans was prepared in the manner described in Example 2A and diazotized in accordance with the procedure described in Example (2Bi). Coupling of the diazotization product with human group-O red blood cells in accordance with the procedure described in Example (2Bii) gave coated cells which were agglutinated by rabbit anti-castor-protein serum. The cells were also used to demonstrate, by rosette formation, passive allergization in vitro of human basophils with serum containing IgE reaginic antibodies to castor allergen.

EXAMPLE 7

(2 - methyl - 4 - carbamoyl - 5 - amino - 1 - imidazolyl)-human serum albumin was prepared according to the procedure described in Example 2A. This was diazotized with a mixture of 200 μl. of 0.4% sodium nitrite and 300 μl. of 1-N hydrochloric acid. After 30 seconds, 200 μl. of 2% ammonium sulfamate solution were added and 20 seconds later all of the mixture was added to a solution of rabbit anti human O antibody in acetate buffer pH 4.8 (1.5 ml. of a solution containing 2 mg. protein per ml.). pH adjustments were carried out as described in Example (1Biib) and the mixture was finally centrifuged to remove insoluble material.

A portion of the supernatant was tested by means of the red-cell-linked-antigen reaction. The coated cells were agglutinated by anti human serum albumin serum and by antirabbit globulin serum, but not by normal human serum.

I claim:
1. A compound of the formula

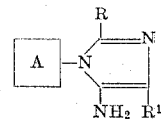

wherein A is a polypeptide, protein or ethyl cellulose linked to said imidazolyl moiety through a primary amine bond or radical; R is hydrogen or alkyl; and $R^1$ is hydrogen, aminocarbonyl, mono-alkylaminocarbonyl, di - alkylaminocarbonyl, alkoxycarbonyl, aralkoxycarbonyl or cyano.

2. The compound of claim 1 wherein A is a protein.
3. The compound of claim 2 wherein A is a mammalian serum protein.
4. The compound of claim 3 wherein A is rabbit antihuman O antibody.
5. The compound of claim 3 wherein A is human serum albumin.
6. The compound of claim 2 wherein A is ovalbumin.
7. The compound of claim 3 wherein A is bovine serum albumin.
8. The compound of claim 2 wherein A is the protein component of pollen extract from timothy grass.
9. The compound of claim 2 wherein R is alkyl and $R^1$ is aminocarbonyl.
10. The compound of claim 9 which is (2-methyl-4-carbamoyl-5-amino-1-imidazolyl) - rabbit anti-human O antibody.
11. The compound of claim 9 which is (2-methyl-4-carbamoyl-5-amino-1-imidazolyl)-ovalbumin.
12. The compound of claim 9 which is (2-methyl-4-carbamoyl-5-amino-1-imidazolyl)-bovine serum albumin.
13. The compound of claim 9 which is (2-methyl-4-carbamoyl-5-amino-1-imidazolyl)-human serum albumin.
14. A compound of the formula

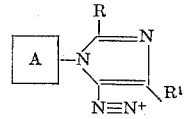

wherein A is a polypeptide, protein or ethyl cellulose linked to said imidazolyl moiety through a primary amine bond radical; R is hydrogen or alkyl; and $R^1$ is hydrogen, aminocarbonyl, mono-alkyl-amino-carbonyl, di-alkylaminocarbonyl, alkoxy-carbonyl, aralkoxycarbonyl or cyano.

15. The compound of claim 14 wherein R is alkyl and $R^1$ is aminocarbonyl.
16. The compound of claim 14 wherein A is a protein radical, R is methyl and $R^1$ is carbamoyl.
17. The compound of claim 16 wherein A is rabbit antihuman O antibody.
18. The compound of claim 16 wherein A is human serum albumin.
19. The compound of claim 16 wherein A is ovalbumin.
20. The compound of claim 16 wherein A is bovine serum albumin.

References Cited

Proceedings of the Chemical Society, pp. 193–194 (1958), Shaw et al.

Annual Review of Biochemistry, vol. 35, 1966, pp. 873–880, Silman et al.

HOWARD E. SCHAIN, Primary Examiner

U.S. Cl. X.R.

260—112 B, 121, 213; 424—12, 35, 36, 85